(12) United States Patent
Wang et al.

(10) Patent No.: US 10,861,441 B2
(45) Date of Patent: Dec. 8, 2020

(54) LARGE MARGIN TRAINING FOR ATTENTION-BASED END-TO-END SPEECH RECOGNITION

(71) Applicant: Tencent America LLC, Palo Alto, CA (US)

(72) Inventors: Peidong Wang, Columbus, OH (US); Jia Cui, Bellevue, WA (US); Chao Weng, Fremont, CA (US); Dong Yu, Bothell, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 98 days.

(21) Appl. No.: 16/276,081

(22) Filed: Feb. 14, 2019

(65) Prior Publication Data
US 2020/0265831 A1     Aug. 20, 2020

(51) Int. Cl.
  *G10L 15/00*    (2013.01)
  *G10L 15/06*    (2013.01)
  *G10L 15/30*    (2013.01)

(52) U.S. Cl.
  CPC ............ *G10L 15/063* (2013.01); *G10L 15/30* (2013.01); *G10L 2015/0635* (2013.01)

(58) Field of Classification Search
  CPC ......... G10L 15/22; G10L 15/30; G10L 15/02; G10L 15/32; G10L 15/063; G10L 17/06; G10L 15/14; G10L 15/065; G10L 15/183; G10L 15/00
  See application file for complete search history.

(56) References Cited

U.S. PATENT DOCUMENTS

| | | | |
|---|---|---|---|
| 5,317,673 A | * | 5/1994 | Cohen ................. G10L 15/144 704/232 |
| 7,761,296 B1 | | 7/2010 | Bakis et al. |
| 10,706,857 B1 | * | 7/2020 | Ramasubramanian ................ G10L 17/18 |
| 2014/0032217 A1 | | 1/2014 | Deligne et al. |

(Continued)

OTHER PUBLICATIONS

K. Audhkhasi et al., "Recent progress in deep end-to-end models for spoken language processing," in IBM Journal of Research and Development, vol. 61, No. 4/5, pp. 2:1-2:10, Jul.-Sep. 1, 2017, doi: 10.1147/JRD.2017.2701207. (Year: 2017).*

(Continued)

*Primary Examiner* — Edgar X Guerra-Erazo
(74) *Attorney, Agent, or Firm* — Sughrue Mion, PLLC

(57) ABSTRACT

A method of attention-based end-to-end (E2E) automatic speech recognition (ASR) training, includes performing cross-entropy training of a model, based on one or more input features of a speech signal, performing beam searching of the model of which the cross-entropy training is performed, to generate an n-best hypotheses list of output hypotheses, and determining a one-best hypothesis among the generated n-best hypotheses list. The method further includes determining a character-based gradient and a word-based gradient, based on the model of which the cross-entropy training is performed and a loss function in which a distance between a reference sequence and the determined one-best hypothesis is maximized, and performing backpropagation of the determined character-based gradient and the determined word-based gradient to the model, to update the model.

20 Claims, 4 Drawing Sheets

(56) References Cited

U.S. PATENT DOCUMENTS

| | | | | |
|---|---|---|---|---|
| 2014/0142929 A1* | 5/2014 | Seide | ............... | G06N 3/08 |
| | | | | 704/202 |
| 2014/0214417 A1* | 7/2014 | Wang | ............... | G10L 17/04 |
| | | | | 704/232 |
| 2015/0199963 A1* | 7/2015 | Maaninen | ............... | G10L 15/16 |
| | | | | 704/232 |
| 2015/0310858 A1* | 10/2015 | Li | ............... | G10L 15/16 |
| | | | | 704/232 |
| 2017/0148431 A1 | 5/2017 | Catanzaro et al. | | |

OTHER PUBLICATIONS

Wang et al., "Large Margin Training for Attention Based End-to-End Speech Recognition", ISCA, Interspeech, 2019, pp. 246-250.

Weng et al., "Improving Attention Based Sequence-to-Sequence Models for End-to-End English Conversational Speech Recognition", Interspeech, 2018, pp. 761-765.

International Search Report dated May 11, 2020, from the International Searching Authority in International Application No. PCT/US2020/017120.

Written Opinion dated May 11, 2020, from the International Bureau in International Application No. PCT/US2020/017120.

\* cited by examiner

LARGE MARGIN TRAINING FOR ATTENTION-BASED END-TO-END SPEECH RECOGNITION

BACKGROUND

Minimum Bayes Risk (MBR) training such as Minimum Word Error Rate (MWER) training aim at minimizing an expected risk on output hypotheses. The risk or loss L could be represented as follows:

$$L(\theta) = \sum_{(\chi,s) \in D} \sum_{s'} l(s', s) p_\theta(s' \mid \chi),$$

where $(\chi, s)$ denotes a sample in a training set D, $\chi$ denotes an input feature, s denotes its corresponding sequence label, s' denotes an output hypothesis generated during training, and $\theta$ denotes model parameters. A difference between s and s' is denoted as $l(s', s)$, which is a word or character level edit distance.

Correspondingly, an output sequence during evaluation may be generated as in the equation below:

$$\hat{s}_{MBR} = \operatorname*{argmin}_{\hat{s}} \sum_{s'} l(s', \hat{s}) p_\theta(s' \mid \chi),$$

where $\hat{s}$ denotes a candidate output sequence, and $\hat{s}_{MBR}$ denotes an output sequence chosen by MBR decoding.

A search space of $\hat{s}$ grows exponentially with its length, making MBR decoding mechanisms such as recognition output voting error reduction (ROVER) inefficient. Although n-best list or confusion network based methods can improve efficiency, beam search decoding based on maximum a posterior (MAP) is still one of the most commonly-used evaluation methods in practice. In MAP decoding, an output hypothesis with a highest (log) posterior is used directly for evaluation as follows:

$$\hat{s}_{MAP} = \operatorname*{argmax}_{\hat{s}} p_\theta(s' \mid \chi)$$

A mismatch between MBR training and MAP decoding indicates that there may be a training scheme that has better efficiency than and comparable performance to MBR training.

SUMMARY

According to embodiments, a method of attention-based end-to-end (E2E) automatic speech recognition (ASR) training, includes performing cross-entropy training of a model, based on one or more input features of a speech signal, performing beam searching of the model of which the cross-entropy training is performed, to generate an n-best hypotheses list of output hypotheses, and determining a one-best hypothesis among the generated n-best hypotheses list. The method further includes determining a character-based gradient and a word-based gradient, based on the model of which the cross-entropy training is performed and a loss function in which a distance between a reference sequence and the determined one-best hypothesis is maximized, and performing backpropagation of the determined character-based gradient and the determined word-based gradient to the model, to update the model.

According to embodiments, an apparatus for attention-based E2E ASR training, includes at least one memory configured to store program code, and at least one processor configured to read the program code and operate as instructed by the program code. The program code includes first performing code configured to cause the at least one processor to perform cross-entropy training of a model, based on one or more input features of a speech signal, second performing code configured to cause the at least one processor to perform beam searching of the model of which the cross-entropy training is performed, to generate an n-best hypotheses list of output hypotheses, and first determining code configured to cause the at least one processor to determine a one-best hypothesis among the generated n-best hypotheses list. The program code further includes second and third determining code configured to cause the at least one processor to determine a character-based gradient and a word-based gradient, based on the model of which the cross-entropy training is performed and a loss function in which a distance between a reference sequence and the determined one-best hypothesis is maximized, and third performing code configured to cause the at least one processor to perform backpropagation of the determined character-based gradient and the determined word-based gradient to the model, to update the model.

According to embodiments, a non-transitory computer-readable medium storing instructions that, when executed by at least one processor of a device, cause the at least one processor to perform cross-entropy training of a model, based on one or more input features of a speech signal, perform beam searching of the model of which the cross-entropy training is performed, to generate an n-best hypotheses list of output hypotheses, and determine a one-best hypothesis among the generated n-best hypotheses list. The instructions further cause the at least one processor to determine a character-based gradient and a word-based gradient, based on the model of which the cross-entropy training is performed and a loss function in which a distance between a reference sequence and the determined one-best hypothesis is maximized, and perform backpropagation of the determined character-based gradient and the determined word-based gradient to the model, to update the model.

DETAILED DESCRIPTION

Figure 1:
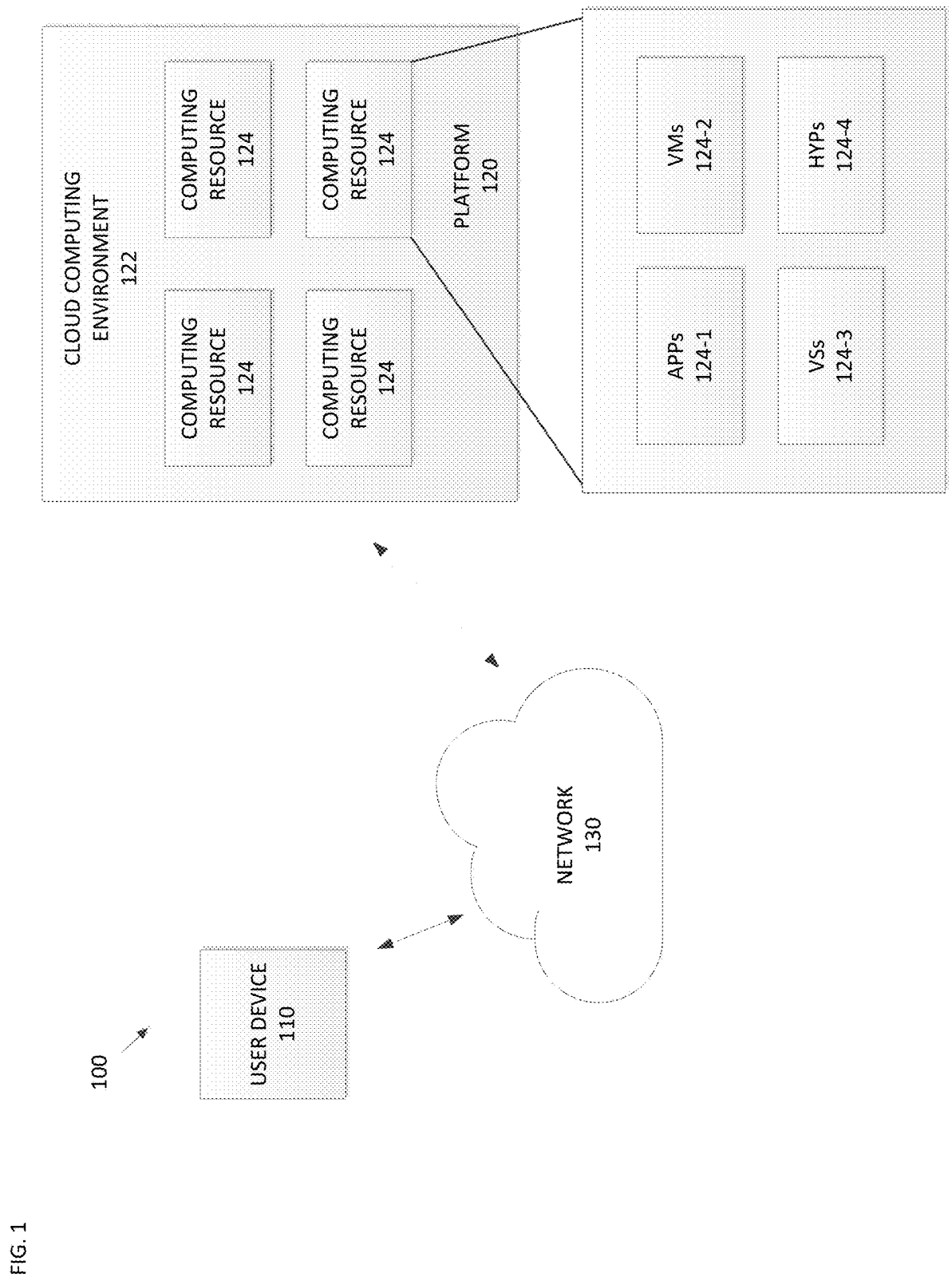
FIG. 1 is a diagram of an environment in which methods, apparatuses and systems described herein may be implemented, according to embodiments.

Attention-based E2E ASR systems have simplified training pipelines compared to conventional recognition systems, but their performance still needs to be improved. Much research has worked on various training strategies to improve recognition correctness.

Embodiments described herein include a sequence-wise large margin training scheme for attention-based E2E ASR systems. Instead of minimizing an expected loss, the training scheme maximizes a margin. In other words, when a best hypothesis is not a reference, a model is trained to maximize a score difference between the best hypothesis and the reference so the model is more discriminative. Different from an MBR-based MWER criterion, this new method focuses on only one hypothesis for each utterance during training, yet can still achieve comparable performance. When a character-level edit distance is adopted in both methods, a large margin method is consistently better than MWER training. The large margin training scheme is also a more succinct formulation of a large margin concept. It keeps an original model structure and is thus easier to apply than current support vector machine (SVM)-based systems. The new model is tested on a benchmark SWB300h data set. It achieves the same performance as a result of MWER training.

In detail, attention-based E2E ASR systems map input audio features into text sequences in three steps, encoding, attention, and decoding. The most commonly used decoder is a recurrent network trained with point-wise cross entropy loss. Recently, sequence discriminative optimization criteria such as the MBR based MWER have been applied to boost model performances. MWER requires multiple hypotheses during training. Because the decoding is based on a commonly used MAP evaluation, a large margin based training criterion may be a better match with the MAP decoding than MBR.

A large margin concept is typically fused with SVMs. By enlarging a margin between a reference sequence and incorrect sequences, an upper bound of generalization errors may be minimized. In recent years, structural SVMs (SSVMs) have been combined with various deep neural networks (DNNs) for speech recognition tasks. In these models, softmax layers are replaced with SSVM layers and a training process consists of two stages. In a first stage, weights of an SSVM layer are calculated using a cutting-plane algorithm on all of training samples. Parameters in the DNNs are then updated with a back-propagation algorithm. Sequence-level implementations of a deep neural support vector machine (DNSVM) have shown superior performances to those of corresponding sequence discriminatively trained DNNs on tasks such as phone short message dictation. The method described herein could keep an original deep neural network structure and therefore be easier to apply than DNSVM.

Definitions of abbreviations and terms occurring in the detailed description include the following:

Speech recognition system: a computer program that enables recognition and translation of speech signals into written characters/words.

Encoder-decoder: a type of model architecture in which an encoder network maps raw inputs into feature representations and a decoder takes the feature representations as input and produces an output.

Attention-based end-to-end (E2E) models: a type of model with encoder-decoder architecture plus an attention scheme that enables the model to learn to focus on specific parts of an input sequence during decoding.

Large Margin: a large margin or max margin is a learning principle that trains a model to maximize a distances of boundary examples.

Support Vector Machine (SVM): a discriminative training method that adopts a large-margin principle, learning an optimal hyperplane that categorizes new examples.

Minimum Bayes Risk (MBR): a training/decoding principle aiming to minimize an expected error in classification.

FIG. 1 is a diagram of an environment 100 in which methods, apparatuses and systems described herein may be implemented, according to embodiments. As shown in FIG. 1, environment 100 may include a user device 110, a platform 120, and a network 130. Devices of environment 100 may interconnect via wired connections, wireless connections, or a combination of wired and wireless connections.

User device 110 includes one or more devices capable of receiving, generating, storing, processing, and/or providing information associated with platform 120. For example, user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 110 may receive information from and/or transmit information to platform 120.

Platform 120 includes one or more devices as described elsewhere herein. In some implementations, platform 120 may include a cloud server or a group of cloud servers. In some implementations, platform 120 may be designed to be modular such that software components may be swapped in or out depending on a particular need. As such, platform 120 may be easily and/or quickly reconfigured for different uses.

In some implementations, as shown, platform 120 may be hosted in cloud computing environment 122. Notably, while implementations described herein describe platform 120 as being hosted in cloud computing environment 122, in some implementations, platform 120 is not be cloud-based (i.e., may be implemented outside of a cloud computing environment) or may be partially cloud-based.

Cloud computing environment 122 includes an environment that hosts platform 120. Cloud computing environment 122 may provide computation, software, data access, storage, etc. services that do not require end-user (e.g., user device 110) knowledge of a physical location and configuration of system(s) and/or device(s) that hosts platform 120. As shown, cloud computing environment 122 may include a group of computing resources 124 (referred to collectively as "computing resources 124" and individually as "computing resource 124").

Computing resource 124 includes one or more personal computers, workstation computers, server devices, or other types of computation and/or communication devices. In some implementations, computing resource 124 may host platform 120. The cloud resources may include compute instances executing in computing resource 124, storage devices provided in computing resource 124, data transfer devices provided by computing resource 124, etc. In some implementations, computing resource 124 may communicate with other computing resources 124 via wired connections, wireless connections, or a combination of wired and wireless connections.

As further shown in FIG. 1, computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

Application 124-1 includes one or more software applications that may be provided to or accessed by user device 110 and/or platform 120. Application 124-1 may eliminate a need to install and execute the software applications on user device 110. For example, application 124-1 may include software associated with platform 120 and/or any other software capable of being provided via cloud computing environment 122. In some implementations, one application 124-1 may send/receive information to/from one or more other applications 124-1, via virtual machine 124-2.

Virtual machine 124-2 includes a software implementation of a machine (e.g., a computer) that executes programs like a physical machine. Virtual machine 124-2 may be either a system virtual machine or a process virtual machine, depending upon use and degree of correspondence to any real machine by virtual machine 124-2. A system virtual machine may provide a complete system platform that supports execution of a complete operating system ("OS"). A process virtual machine may execute a single program, and may support a single process. In some implementations, virtual machine 124-2 may execute on behalf of a user (e.g., user device 110), and may manage infrastructure of cloud computing environment 122, such as data management, synchronization, or long-duration data transfers.

Virtualized storage 124-3 includes one or more storage systems and/or one or more devices that use virtualization techniques within the storage systems or devices of computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 124-4 may provide hardware virtualization techniques that allow multiple operating systems (e.g., "guest operating systems") to execute concurrently on a host computer, such as computing resource 124. Hypervisor 124-4 may present a virtual operating platform to the guest operating systems, and may manage the execution of the guest operating systems. Multiple instances of a variety of operating systems may share virtualized hardware resources.

Network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
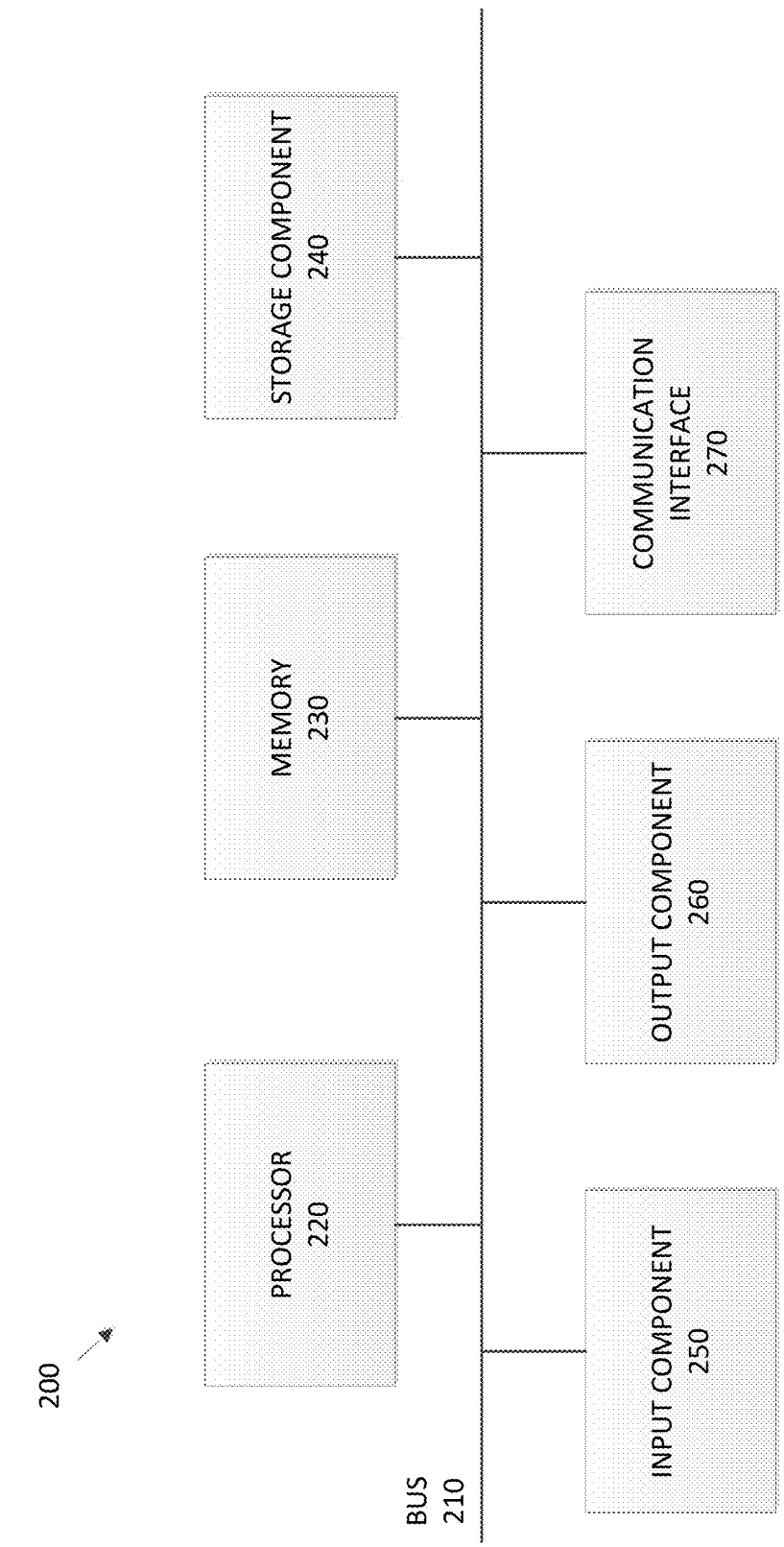
FIG. 2 is a diagram of example components of one or more devices of FIG. 1.

FIG. 2 is a diagram of example components of one or more devices of FIG. 1. A device 200 may correspond to user device 110 and/or platform 120. As shown in FIG. 2, device 200 may include a bus 210, a processor 220, a memory 230, a storage component 240, an input component 250, an output component 260, and a communication interface 270.

Bus 210 includes a component that permits communication among the components of device 200. Processor 220 is implemented in hardware, firmware, or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 250 includes a component that permits device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). Output component 260 includes a component that provides output information from device 200 (e.g., a display, a speaker, and/or one or more light-emitting diodes (LEDs)).

Communication interface 270 includes a transceiver-like component (e.g., a transceiver and/or a separate receiver and transmitter) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

Device 200 may perform one or more processes described herein. Device 200 may perform these processes in response to processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Embodiments described herein include a training method based on sequence-wise loss functions Like other sequence-based training methods, this training method may be applied after a model is trained with point-wise cross-entropy loss. The training method is not limited to speech recognition, but can also be applied in other sequence-to-sequence tasks.

Figure 3:
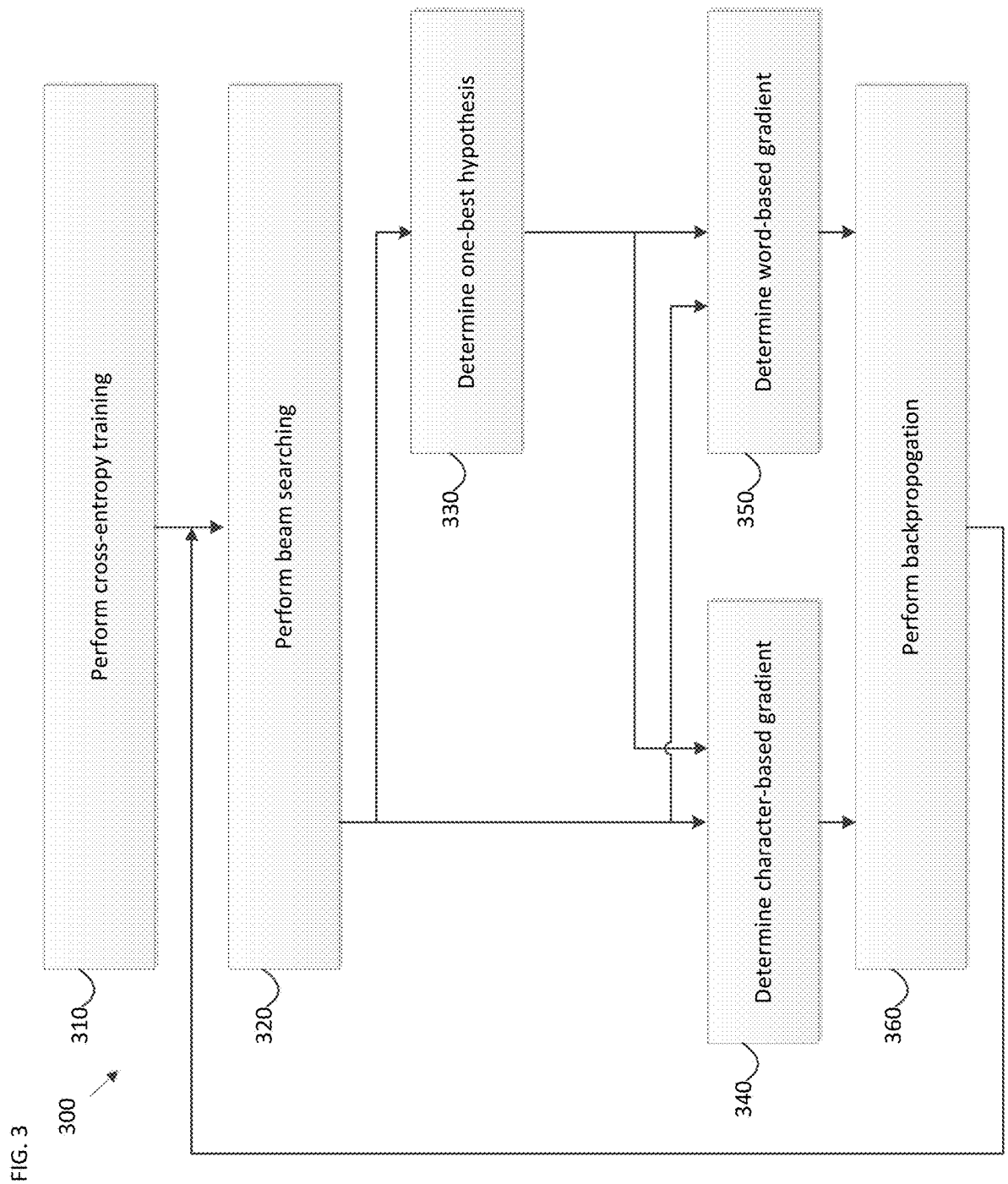
FIG. 3 is a flowchart of a method of attention-based E2E ASR training, according to embodiments.

FIG. 3 is a flowchart of a method 300 of attention-based E2E ASR training, according to embodiments. In some implementations, one or more process blocks of FIG. 3 may be performed by platform 120. In some implementations, one or more process blocks of FIG. 3 may be performed by another device or a group of devices separate from or including platform 120, such as user device 110.

As shown in FIG. 3, in operation 310, the method 300 includes performing cross-entropy training of a model, based on one or more input features of a speech signal. Based on the cross-entropy training being performed, the method 300 includes performing large margin training of the model of which the cross-entropy training is performed, in operations 320-360.

Large margin training refers to a sequence-level training criterion enlarging a distance between a reference sequence and a most competing incorrect sequence. The following Equation (1) shows a margin of a reference sequence s to a most competing incorrect sequence ŝ and a loss function L( ) defined on a whole training data set D:

$$L(\theta) = \sum_{(\chi,s) \in D} \max_{\hat{s} \neq s} \{\log p_\theta(\hat{s} | \chi) - \log p_\theta(s | \chi)\} \quad (1)$$

Referring to Equation (2) below, a threshold l(ŝ, s) controls a desired distance between the reference sequence and the most competing incorrect sequence. To filter out samples that have already satisfied a constraint of the threshold, a hinge function [•]+ is applied. The loss function is in a squared form so that it can impact not only a sign but also a value of its gradients.

In operation 320, the method 300 includes performing beam searching of the model of which the cross-entropy training is performed, to generate an n-best hypotheses list of output hypotheses or sequences having, e.g., highest posteriors.

In operation 330, the method 300 includes determining a one-best hypothesis among the generated n-best hypotheses list.

Different from hidden Markov model (HMM) based systems, attention-based E2E ASR systems cannot generate full posterior graphs because of explicit dependencies between output tokens. A common approximation of a posterior graph is the n-best hypotheses list. In the n-best hypotheses list, a one-best hypothesis is chosen to be the most competing incorrect hypothesis. The loss function therefore is as follows in Equation (2), in which $s_b$ denotes the one-best hypothesis:

$$L(\theta) = \sum_{(\chi,s) \in D} [l(\hat{s}_b, s) - (\log p_\theta(s | \chi) - \log p_\theta(\hat{s}_b | \chi))]_+^2 \quad (2)$$

In attention-based E2E systems, a log posterior of a hypothesis can be interpreted as a score. Above Equation (2) can thus be written as Equation (3) below, in which score ( ) is un-normalized by a sequence length:

$$L(\theta) = \sum_{(\chi,s) \in D} [l(\hat{s}_b, s) - (\text{score}_\theta(s | \chi) - \text{score}_\theta(\hat{s}_b | \chi))]_+^2 \quad (3)$$

In operation 340, the method 300 includes determining a character-based gradient, based on the model of which the cross-entropy training is performed and the loss function in which the distance between the reference sequence and the determined one-best hypothesis is maximized.

In operation 350, the method 300 includes determining a word-based gradient, based on the model of which the cross-entropy training is performed and the loss function in which the distance between the reference sequence and the determined one-best hypothesis is maximized.

The threshold l(ŝ$_b$,s) may be chosen to be a word and/or character level edit distance. Each of Equations (4) below gives a gradient at a top layer where δ(•) is the Kronecker delta (indicator) function and [l(ŝ$_b$,s)−(score$_\theta$(s)−score$_\theta$(ŝ$_b$))]+ is denoted by γ+:

$$\frac{\partial L(\theta)}{\partial \log p_\theta(s_i)} = -2\gamma_+ \delta(s_i) \quad (4)$$

$$\frac{\partial L(\theta)}{\partial \log p_\theta(\hat{s}_{b,i})} = 2\gamma_+ \delta(\hat{s}_{b,i})$$

Repetitive training on a beginning correct segment of ŝ$_b$ may make a training process unstable and prone to overfitting. To avoid training instability and overfitting, the gradients in above Equations (4) may be applied starting from a first wrong token in ŝ$_b$ as follows in Equations (5):

$$\frac{\partial L(\theta)}{\partial \log p_\theta(s_i)} = -2\gamma_+ \delta(s_i) \delta(i \geq w) \quad (5)$$

$$\frac{\partial L(\theta)}{\partial \log p_\theta(\hat{s}_{b,i})} = 2\gamma_+ \delta(\hat{s}_{b,i}) \delta(i \geq w)$$

With the gradients with respect to log posteriors being manually assigned, gradients for other parameters can be automatically derived by deep learning platforms such as PyTorch and Chainer.

In operation 360, the method 300 includes performing backpropagation of the determined character-based gradient and the determined word-based gradient to the model, to update the model. The method 300 returns to operation 320 to continue the large margin training.

The method 300 could be implemented with different loss functions. In the above embodiments, character-based and word-based loss functions are used. When applied to other sequence learning tasks such as translation, a loss function could be based on bilingual evaluation understudy (BLEU) scores, etc. Even though the method 300 is targeted to maximize a margin, multiple boundary examples could be applied. There are also various ways of selecting a set of hypotheses, besides that described in the embodiments, in which hypotheses with highest posteriors are beam-searched. Finally, a gradient calculation on hypotheses could also be different. Gradients in all locations or just those at special locations may be used.

Although FIG. 3 shows example blocks of the method 300, in some implementations, the method 300 may include additional blocks, fewer blocks, different blocks, or differently arranged blocks than those depicted in FIG. 3. Additionally, or alternatively, two or more of the blocks of the method 300 may be performed in parallel.

Embodiments provide similar performance as those of a MWER method on the same benchmark data set. The embodiments combine a large margin principle with deep neural network learning, which is easier to apply than a current SVM deep learning combination method.

Models according to embodiments are compared with a benchmark SWB300h data set. The setup is the same as in MWER with 40-dim log mel thank features as input and 49 characters as output. The E2E framework is input-feeding label attachment score (LAS) with 6 bidirectional-Long Short Term Memory (BiLSTM) as an encoder and 2 LSTM as a decoder. A baseline cross-entropy model is the same as that of MWER, which is trained with a scheduled sampling empowered cross entropy criterion. An Adam optimizer is used for training and an initial learning rate is $7.5*10^{-7}$. A dropout rate is selected to be 0.2 and a size of a mini batch is 8. For large margin training, in addition to large margin training on a one-best hypothesis, results using multiple hypotheses are reported. A number of hypotheses in MWER and a multi-hypothesis large margin criterion are the same. Results without using an external language model are denoted as "w/o LM" and those with language model are denoted as "w/ LM."

Compared with a baseline WER of 13.3%, a result of large margin training on a one-best hypothesis obtains a 6.8% relative improvement, and that on a four-best hypotheses obtains an 8.3% relative improvement, as shown in Table 1:

TABLE 1

Results and comparisons
of large margin training

| criteria | w/o LM | w/LM |
|---|---|---|
| Cross Entropy [10] | 13.3 | — |
| MWER (4-best) [10, 12] | 12.2 | 12.0 |
| Large Margin | 12.4 | 12.0 |
| Large Margin (4-best) | 12.2 | 12.0 |

Table 3 shows a comparison with other published results:

TABLE 3

Comparisons with previously
proposed attention based end-end systems

| systems | SWBD | CH |
|---|---|---|
| Seq2Seq + Trigram [6] | 25.8 | 46.0 |
| BPE + LSTMLM [7] | 11.8 | 25.7 |

TABLE 3-continued

Comparisons with previously
proposed attention based end-end systems

| systems | SWBD | CH |
|---|---|---|
| MWER w/o LM [10] | 12.2 | 23.3 |
| MWER + LSTMLM [12] | 12.0 | 23.1 |
| Large Margin w/o LM (proposed) | 12.4 | 24.3 |
| Large Margin LSTMLM (proposed) | 12.0 | 24.6 |

Figure 4:
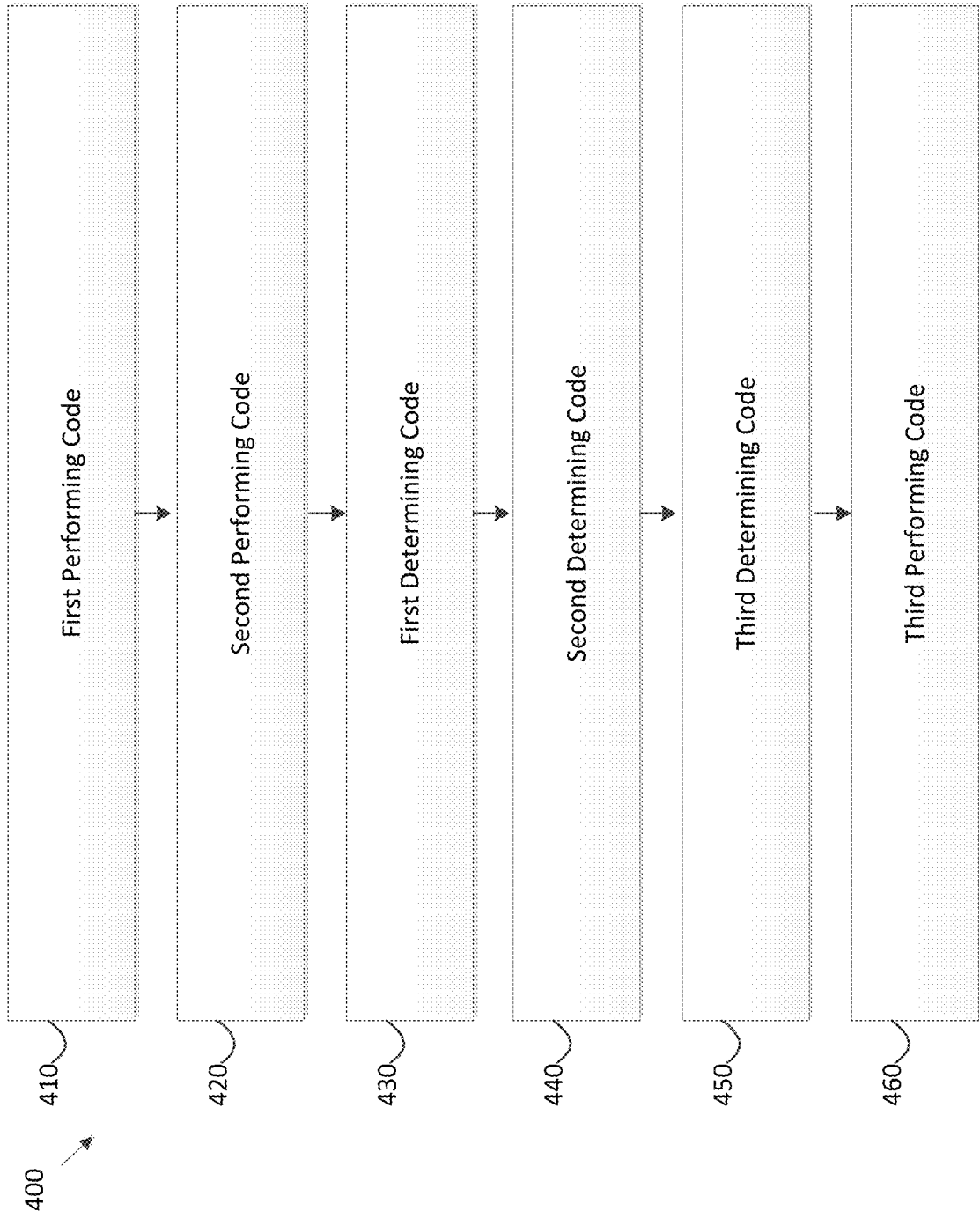
FIG. 4 is a diagram of an apparatus for attention-based E2E ASR training, according to embodiments.

FIG. 4 is a diagram of an apparatus 400 for attention-based E2E ASR training, according to embodiments. As shown in FIG. 4, the apparatus 400 includes first performing code 410, second performing code 420, first determining code 430, second determining code 440, third determining code 450 and third performing code 460.

The first performing code 410 is configured to perform cross-entropy training of a model, based on one or more input features of a speech signal.

The second performing code 420 is configured to perform beam searching of the model of which the cross-entropy training is performed, to generate an n-best hypotheses list of output hypotheses.

The first determining code 430 is configured to determine a one-best hypothesis among the generated n-best hypotheses list.

The second determining code 440 and the third determining code 450 are respectively configured to determine a character-based gradient and a word-based gradient, based on the model of which the cross-entropy training is performed and a loss function in which a distance between a reference sequence and the determined one-best hypothesis is maximized.

The third performing code is configured to perform back-propagation of the determined character-based gradient and the determined word-based gradient to the model, to update the model.

The output hypotheses included in the generated n-best hypotheses list may have highest posteriors among output sequences of the model of which the cross-entropy training is performed.

The second performing code 420 may be further configured to, based on the backpropagation of the determined character-based gradient and the determined word-based gradient to the model being performed, perform again the beam searching of the model of which the cross-entropy training is performed, to regenerate the n-best hypotheses list.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of attention-based end-to-end (E2E) automatic speech recognition (ASR) training, the method comprising:
   performing cross-entropy training of a model, based on one or more input features of a speech signal;
   performing beam searching of the model of which the cross-entropy training is performed, to generate an n-best hypotheses list of output hypotheses;
   determining a one-best hypothesis among the generated n-best hypotheses list;
   determining a character-based gradient and a word-based gradient, based on the model of which the cross-entropy training is performed and a loss function in which a distance between a reference sequence and the determined one-best hypothesis is maximized; and
   performing backpropagation of the determined character-based gradient and the determined word-based gradient to the model, to update the model.

2. The method of claim 1, wherein the output hypotheses included in the generated n-best hypotheses list have highest posteriors among output sequences of the model of which the cross-entropy training is performed.

3. The method of claim 1, wherein the loss function is represented as follows:

$$L(\theta) = \sum_{(\chi,s)\in D} [l(\hat{s}_b, s) - (\log p_\theta(s\mid\chi) - \log p_\theta(\hat{s}_b\mid\chi))]_+^2,$$

where ($\chi$, s) denotes a sample in a training set D, $\chi$ denotes an input feature, s denotes the reference sample, $\hat{s}_b$, denotes the one-best hypothesis, $l(\hat{s}, s)$ denotes the distance between the reference sequence and the determined one-best hypothesis, and $\theta$ denotes model parameters.

4. The method of claim 1, wherein the loss function is represented as follows:

$$L(\theta) = \sum_{(\chi,s)\in D} [l(\hat{s}_b, s) - (\text{score}_\theta(s\mid\chi) - \text{score}_\theta(\hat{s}_b\mid\chi))]_+^2,$$

where ($\chi$, s) denotes a sample in a training set D, $\chi$ denotes an input feature, s denotes the reference sample, $\hat{s}_b$, denotes the one-best hypothesis, $l(\hat{s}, s)$ denotes the distance between the reference sequence and the determined one-best hypothesis, $\theta$ denotes model parameters, and score denotes a log posterior.

5. The method of claim 4, wherein each of the character-based gradient and the word-based gradient is represented as follows:

$$\frac{\partial L(\theta)}{\partial \log p_\theta(s_i)} = -2\gamma_+ \delta(s_i)$$

$$\frac{\partial L(\theta)}{\partial \log p_\theta(\hat{s}_{b,i})} = 2\gamma_+ \delta(\hat{s}_{b,i}),$$

where $\delta(\cdot)$ denotes a Kronecker delta function, and $\gamma+$ denotes $[l(\hat{s}_b,s)-(\text{score}_\theta(s)-\text{score}_\theta(\hat{s}_b))]$.

6. The method of claim 4, wherein each of the character-based gradient and the word-based gradient is represented as follows:

$$\frac{\partial L(\theta)}{\partial \log p_\theta(s_i)} = -2\gamma_+ \delta(s_i)\delta(i \geq w)$$

$$\frac{\partial L(\theta)}{\partial \log p_\theta(\hat{s}_{b,i})} = 2\gamma_+ \delta(\hat{s}_{b,i})\delta(i \geq w),$$

where $\delta(\cdot)$ denotes a Kronecker delta function, $\gamma+$ denotes $[l(\hat{s}_b,s)-(\text{score}_\theta(s)-\text{score}_\theta(\hat{s}_b))]$, and $\omega$ denotes a first wrong token.

7. The method of claim 1, further comprising, based on the backpropagation of the determined character-based gradient and the determined word-based gradient to the model being performed, performing again the beam searching of the model of which the cross-entropy training is performed, to regenerate the n-best hypotheses list.

8. An apparatus for attention-based end-to-end (E2E) automatic speech recognition (ASR) training, the apparatus comprising:
   at least one memory configured to store program code; and
   at least one processor configured to read the program code and operate as instructed by the program code, the program code including:
     first performing code configured to cause the at least one processor to perform cross-entropy training of a model, based on one or more input features of a speech signal;
     second performing code configured to cause the at least one processor to perform beam searching of the model of which the cross-entropy training is performed, to generate an n-best hypotheses list of output hypotheses;
     first determining code configured to cause the at least one processor to determine a one-best hypothesis among the generated n-best hypotheses list;
     second and third determining code configured to cause the at least one processor to determine a character-based gradient and a word-based gradient, based on the model of which the cross-entropy training is performed and a loss function in which a distance between a reference sequence and the determined one-best hypothesis is maximized; and third performing code configured to cause the at least one processor to perform backpropagation of the determined character-based gradient and the determined word-based gradient to the model, to update the model.

9. The apparatus of claim 8, wherein the output hypotheses included in the generated n-best hypotheses list have highest posteriors among output sequences of the model of which the cross-entropy training is performed.

10. The apparatus of claim 8, wherein the loss function is represented as follows:

$$L(\theta) = \sum_{(\chi,s)\in D} [l(\hat{s}_b, s) - (\log p_\theta(s|\chi) - \log p_\theta(\hat{s}_b|\chi))]_+^2,$$

where $(\chi, s)$ denotes a sample in a training set D, $\chi$ denotes an input feature, s denotes the reference sample, $\hat{s}_b$ denotes the one-best hypothesis, $l(\hat{s}, s)$ denotes the distance between the reference sequence and the determined one-best hypothesis, and $\theta$ denotes model parameters.

11. The apparatus of claim 8, wherein the loss function is represented as follows:

$$L(\theta) = \sum_{(\chi,s)\in D} [l(\hat{s}_b, s) - (\text{score}_\theta(s|\chi) - \text{score}_\theta(\hat{s}_b|\chi))]_+^2,$$

where $(\chi, s)$ denotes a sample in a training set D, $\chi$ denotes an input feature, s denotes the reference sample, $\hat{s}_b$, denotes the one-best hypothesis, $l(\hat{s}, s)$ denotes the distance between the reference sequence and the determined one-best hypothesis, $\theta$ denotes model parameters, and score denotes a log posterior.

12. The apparatus of claim 11, wherein each of the character-based gradient and the word-based gradient is represented as follows:

$$\frac{\partial L(\theta)}{\partial \log p_\theta(s_i)} = -2\gamma_+ \delta(s_i)$$

$$\frac{\partial L(\theta)}{\partial \log p_\theta(\hat{s}_{b,i})} = 2\gamma_+ \delta(\hat{s}_{b,i}),$$

where $\delta(\bullet)$ denotes a Kronecker delta function, and $\gamma+$ denotes $[l(\hat{s}_b,s)-(\text{score}_\theta(s)-\text{score}_\theta(\hat{s}_b))]$.

13. The apparatus of claim 11, wherein each of the character-based gradient and the word-based gradient is represented as follows:

$$\frac{\partial L(\theta)}{\partial \log p_\theta(s_i)} = -2\gamma_+ \delta(s_i)\delta(i \geq w)$$

$$\frac{\partial L(\theta)}{\partial \log p_\theta(\hat{s}_{b,i})} = 2\gamma_+ \delta(\hat{s}_{b,i})\delta(i \geq w),$$

where $\delta(\bullet)$ denotes a Kronecker delta function, $\gamma+$ denotes $[l(\hat{s}_b,s)-(\text{score}_\theta(\hat{s})-\text{score}_\theta(\hat{s}_b))]$, and $\omega$ denotes a first wrong token.

14. The apparatus of claim 8, wherein the second performing code is further configured to cause the at least one processor to, based on the backpropagation of the determined character-based gradient and the determined word-based gradient to the model being performed, perform again the beam searching of the model of which the cross-entropy training is performed, to regenerate the n-best hypotheses list.

15. A non-transitory computer-readable medium storing instructions that, when executed by at least one processor of a device, cause the at least one processor to:

perform cross-entropy training of a model, based on one or more input features of a speech signal;

perform beam searching of the model of which the cross-entropy training is performed, to generate an n-best hypotheses list of output hypotheses;

determine a one-best hypothesis among the generated n-best hypotheses list;

determine a character-based gradient and a word-based gradient, based on the model of which the cross-entropy training is performed and a loss function in which a distance between a reference sequence and the determined one-best hypothesis is maximized; and perform backpropagation of the determined character-based gradient and the determined word-based gradient to the model, to update the model.

16. The non-transitory computer-readable medium of claim 15, wherein the output hypotheses included in the generated n-best hypotheses list have highest posteriors among output sequences of the model of which the cross-entropy training is performed.

17. The non-transitory computer-readable medium of claim 15, wherein the loss function is represented as follows:

$$L(\theta) = \sum_{(\chi,s)\in D} [l(\hat{s}_b, s) - (\log p_\theta(s|\chi) - \log p_\theta(\hat{s}_b|\chi))]_+^2,$$

where $(\chi, s)$ denotes a sample in a training set D, $\chi$ denotes an input feature, s denotes the reference sample, $\hat{s}_b$ denotes the one-best hypothesis, $l(\hat{s}, s)$ denotes the distance between the reference sequence and the determined one-best hypothesis, and $\theta$ denotes model parameters.

18. The non-transitory computer-readable medium of claim 15, wherein the loss function is represented as follows:

$$L(\theta) = \sum_{(\chi,s)\in D} [l(\hat{s}_b, s) - (\text{score}_\theta(s|\chi) - \text{score}_\theta(\hat{s}_b|\chi))]_+^2,$$

where $(\chi, s)$ denotes a sample in a training set D, $\chi$ denotes an input feature, s denotes the reference sample, $\hat{s}_b$ denotes the one-best hypothesis, $l(\hat{s}, s)$ denotes the distance between the reference sequence and the determined one-best hypothesis, $\theta$ denotes model parameters, and score denotes a log posterior.

19. The non-transitory computer-readable medium of claim 18, wherein each of the character-based gradient and the word-based gradient is represented as follows:

$$\frac{\partial L(\theta)}{\partial \log p_\theta(s_i)} = -2\gamma_+ \delta(s_i)$$

-continued $$\frac{\partial L(\theta)}{\partial \log p_\theta(\hat{s}_{b,i})} = 2\gamma_+ \delta(\hat{s}_{b,i}),$$

where $\delta(\cdot)$ denotes a Kronecker delta function, and $\gamma+$ denotes $[l(\hat{s}_b,s)-(score_\theta(s)-score_\theta(\hat{s}_b))]$.

20. The non-transitory computer-readable medium of claim 18, wherein each of the character-based gradient and the word-based gradient is represented as follows:

$$\frac{\partial L(\theta)}{\partial \log p_\theta(s_i)} = -2\gamma_+ \delta(s_i)\delta(i \geq w)$$

$$\frac{\partial L(\theta)}{\partial \log p_\theta(\hat{s}_{b,i})} = 2\gamma_+ \delta(\hat{s}_{b,i})\delta(i \geq w),$$

where $\delta(\cdot)$ denotes a Kronecker delta function, $\gamma+$ denotes $[l(\hat{s}_b,s)-(score_\theta(s)-score_\theta(\hat{s}_b))]$, and $\omega$ denotes a first wrong token.

\* \* \* \* \*